United States Patent [19]

Anderson

[11] 4,032,177
[45] June 28, 1977

[54] COMPRESSION FITTING WITH TUBING REINFORCING INSERT

[76] Inventor: David N. Anderson, 3701 Green Vista, Encino, Calif. 91316

[22] Filed: Mar. 18, 1976

[21] Appl. No.: 667,889

[52] U.S. Cl. .................................. 285/24; 285/249
[51] Int. Cl.² ........................................ F16L 33/20
[58] Field of Search ....... 285/249, 248, 250, 382.7, 285/24, 27, 259, 256, 247

[56] References Cited

UNITED STATES PATENTS

| | | | |
|---|---|---|---|
| 2,497,273 | 2/1950 | Richardson | 285/382.7 X |
| 3,219,367 | 11/1965 | Franck | 285/382.7 X |
| 3,545,794 | 12/1970 | Wise et al. | 285/248 |
| 3,591,208 | 7/1971 | Nicolaus | 285/250 |
| 3,679,239 | 7/1972 | Schmitt | 285/249 X |
| 3,784,730 | 1/1974 | Bannies | 285/248 X |
| 3,830,531 | 8/1974 | Burge | 285/249 X |
| 3,834,742 | 9/1974 | McPhillips | 285/382.7 X |
| 3,834,743 | 9/1974 | Strybel | 285/249 |
| 3,907,335 | 9/1975 | Burge et al. | 285/249 X |
| 3,915,479 | 10/1975 | Sotolongo | 285/249 X |

FOREIGN PATENTS OR APPLICATIONS

| | | | |
|---|---|---|---|
| 1,313,935 | 11/1962 | France | 285/249 |
| 956,500 | 4/1964 | United Kingdom | 285/249 |

*Primary Examiner*—Thomas F. Callaghan
*Attorney, Agent, or Firm*—Poms, Smith, Lande & Glenny

[57] ABSTRACT

A compression type end fitting for a non-metal flexible tubing wherein the fitting includes a tubing receiving bore terminating at an internal stop shoulder with a continuing smaller diameter throughbore, a nut subassembly of a nut and compression sleeve having a nut receiving throughbore has a tubing reinforcing insert loosely retained within the body and nut sub-assembly when the latter are preassembled preparatory to receiving the tubing through the nut sub-assembly. The insert has a circular flange for loosely retaining the insert within the fitting body bore and has a guide end protruding outwardly of the nut sub-assembly when the latter is assembled to the fitting body to provide for an initial engagement with the tubing and for a prealigning of the tubing, insert and nut sub-assembly throughbore preparatory to pressing the tubing into the fitting and final tightening of the nut sub-assembly on to the fitting.

2 Claims, 5 Drawing Figures

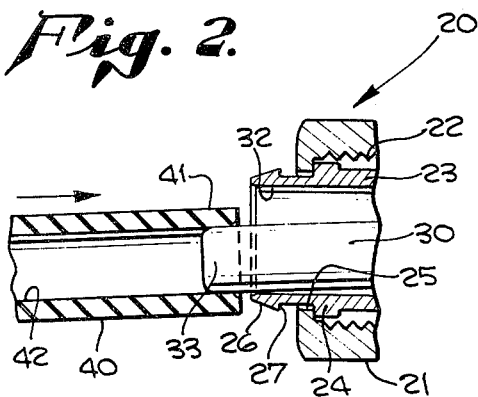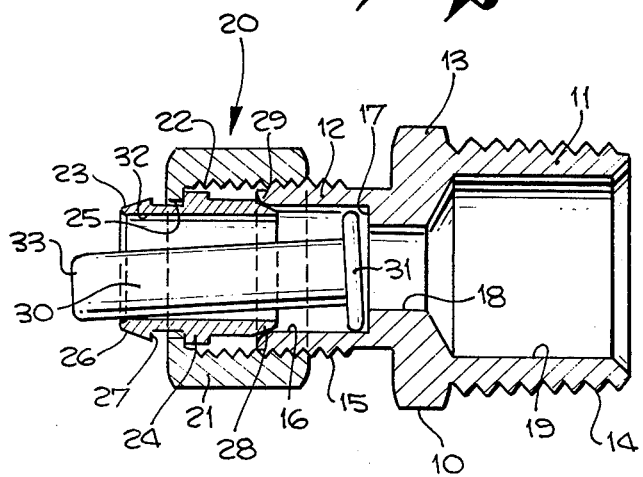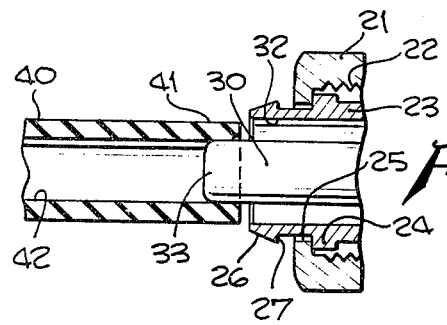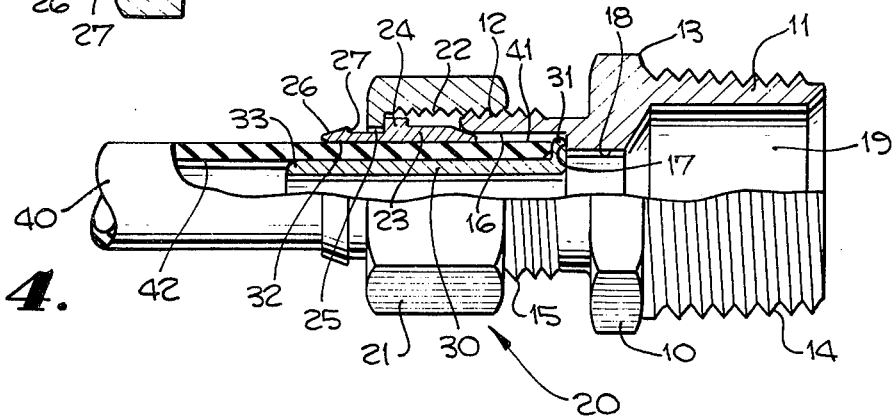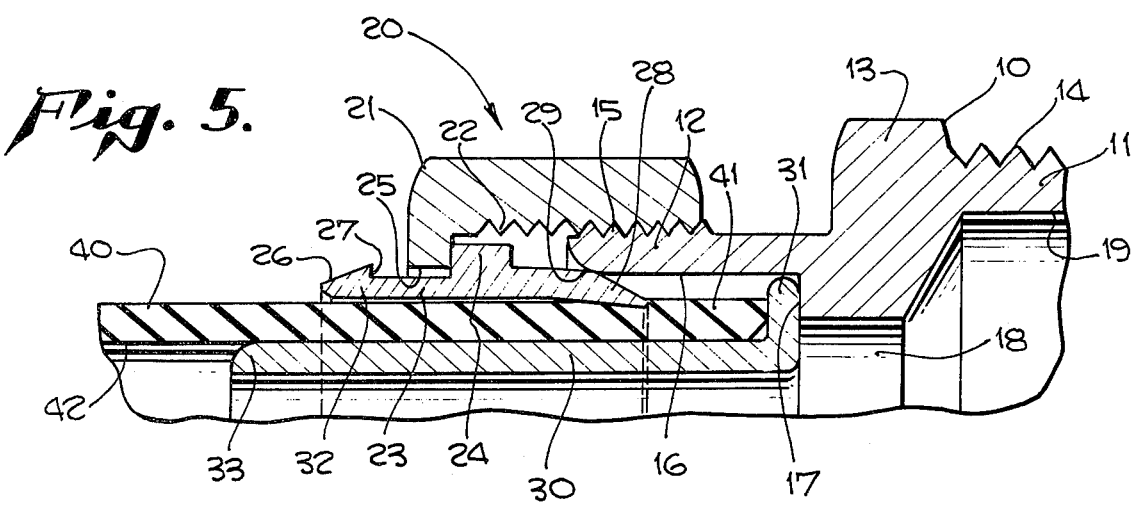

COMPRESSION FITTING WITH TUBING REINFORCING INSERT

BACKGROUND OF THE INVENTION

This invention relates in general to compression type end fittings and specifically to compression type and fittings for non-metal flexible tubing wherein a tubing reinforcing insert is placed within the tubing to provide support therefor when the compression fitting is tightened about the tubing.

Various types of compression fittings have been employed heretofore for joining non-metal flexible tubing to a valve body fitting wherein a tubing reinforcing insert is employed. Examples thereof are U.S. Pat. Nos. 3,830,531; 3,834,742; 3,903,335; 3,915,479 and 3,685,860. In each of these prior patents, means are provided on the tubing insert for holding it in a removable press fit relationship to the fitting tubing receiving bore or throughbore so that the tubing insert is substantially aligned within the preassembled nut sub-assembly normally employed in compression type fittings. However, it has been found that the tolerances for the internal and external diameters of non-metal flexible tubing, generally of a plastic material, vary sufficiently as to cause difficulty in suitably aligning the tubing, insert and the bores of the nut sub-assembly and fitting so that the tubing can be easily pressed through the nut sub-assembly bore over the insert and into the fitting tubing receiving bore.

SUMMARY OF THE INVENTION

It is therefore an object of the present invention to disclose and provide an improvement in construction and method of assemblying a compression type and fitting for non-metal flexible tubing wherein the tubing and tubing insert may be prealigned preparatory to pressing the tubing into the fitting through the nut sub-assembly when the latter is in finger tight preassembled relation on the fitting body.

It is a further object of the present invention to disclose and provide a construction and method as in the foregoing object which is easily and inexpensively accomplished in such manner that ordinary manufacturing tolerances may be employed in making the compression type end fitting for non-metal flexible tubing of varying wall thicknesses.

Generally stated, the present invention includes the provision of a tubing reinforcing insert lossely within the fitting tubing receiving bore and then assemblying a nut sub-assembly of nut and compression sleeve on to the fitting in finger tight relation. Retaining means are provided on the insert for loosely retaining it within the fitting tubing receiving bore and, as particularly contemplated within the present invention and method, guide means are provided on the insert for extending outwardly of the nut subassembly throughbore regardless of its position therein. A free end of tubing is then fitted over the guide means of the insert to align the tubing and insert, while the latter is held within the fitting and the tubing is still outside of the fitting. After aligning the tubing to the fitting and moving the tubing and fitting into a position where the tubing is aligned to the nut sub-assembly throughbore, the tubing is pressed through the nut sub-assembly throughbore into the fitting tubing receiving bore pressing the insert against an inner retaining shoulder within the fitting. The nut sub-assembly is then turned into tightened relationship on the fitting body to hold the tubing to the fitting. More specifically, the insert retaining means may comprise a circular flange on one end of the insert which has a diameter larger than the throughbores of the nut sub-assembly and fitting and smaller than the fitting tubing receiving bore while the guide means may comprise an oppositely extending free end of the insert which protrudes outwardly of the nut sub-assembly throughbore by approximately one-eighth of an inch when the insert flange is abutting an internal stop shoulder formed between the fitting tubing receiving bore and fitting throughbore.

A more complete understanding of the present invention, as well as an appreciation for various advantages and objects of the present invention will be afforded to those skilled in the art from a consideration of the following detailed description of a preferred exemplary embodiment thereof. Reference will be made to the appended sheet of drawings which will first be briefly described.

BRIEF DESCRIPTION OF THE DRAWINGS:

FIG. 1 is a section view of a preferred exemplary embodiment of compression type end fitting for non-metal flexible tubing employing the improvement in construction and method of assemblying the tubing over a tubing reinforcing insert lossely retained within the fitting preparatory to assembly of the fitting and tubing;

FIG. 2 is a detail view of the fitting of FIG. 1 showing the tubing placed over a free end of the tubing insert which protrudes outwardly of the fitting assembly;

FIG. 3 is a detail view as in FIG. 2 showing the tubing, insert and fitting assembly bore aligned to one another;

FIG. 4 is a section view of the fitting of FIGS. 1 through 3 showing the tubing fully pressed into the fitting assembly over the tubing support insert; and FIG. 5 is a detail view of the fitting of FIGS. 1 through 4 showing the associated nut and sleeve sub-assembly tightened onto the fitting compressing the tubing about the insert.

DETAILED DESCRIPTION OF A PREFERRED EXEMPLARY EMBODIMENT:

Referring initially to FIG. 1, a detailed description of a preferred exemplary embodiment of the construction and method of the present invention in compression type end fittings will now be presented. The preferred embodiment of compression type end fitting includes a fitting body 10 having a large diameter coupling portion 11 and a smaller diameter forward coupling portion 12 separated by a hexhead central portion 13. As is conventional, coupling portions 11 and 12 are provided with external pipe threads 14 and 15.

A tubing receiving bore 16 is provided in the forward coupling portion 12 for receiving a tubing to be held to the fitting body 10. Bore 16 terminates at its inner end at a stop shoulder 17 with a small diameter through bore 18 which opens into a larger diameter coupling bore 19.

A conventional nub sub-assembly for compression type fittings is illustrated generally at 20 and includes a nut 21 having internal pipe threads 22 mating with the external threads 15 of the forward coupling portion 12 of fitting 10. A compression type sleeve 23 is preassembled within the nut with a stop shoulder 24 preventing the sleeve from passing rearwardly out of nut bore 25. A projecting portion 26 of sleeve 23 has a stop shoulder 27 which prevents the sleeve from inadvertent disassembly from the nut in known manner. Compression sleeve 23 has a forward conical surface 28 which is adapted to align to and be forced radially inwardly by concave conical surface 29 at the forward end of coupling portion 12. As is known in the art, on turning of nut 21 in a tightening manner on fitting 10, compression sleeve 23 is compressed inwardly to tightly hold a tubing placed within the sleeve to the fitting as will be more fully explained hereinafter.

As particularly contemplated within the present invention, an improved construction for tubing insert, and method of assemblying the tubing to the insert and fitting is provided in the exemplary embodiment. As seen in FIG. 1, a tubing reinforcing insert 30 is preassembled within the fitting bore 16 and within the nut and sleeve assembly indicated generally at 20. Insert 30 may be preassembled within the fitting bore 16 before the nut and sleeve assembly, indicated generally at 30, is turned into finger tight relation with the forward coupling portion 12 as illustrated in FIG. 1.

Retaining means are provided upon insert 30 for loosely retaining it within the fitting. In the exemplary embodiment, such retaining means includes the provision of circular flange 31 on the inner end of the insert 30. Flange 31 is preferably provided with an outer diameter which is less than the inner diameter of the tubing receiving bore 16 so as to be loosely movable therein with freedoom for transverse movement. However, the diameter of flange 31 is also larger than the internal diameter of the fitting throughbore 18 and the inner diameter 32 of the nut sub-assembly indicated generally at 20. Thereby, the insert 30 may be loosely retained within the fitting and be shipped or stored in preassembled relationship to the assembled nut sub-assembly and fitting body 10.

As is specifically contemplated within the present invention, guide means are provided on insert 30 for extending outwardly of the nut sub-assembly and specifically outwardly of the throughbore 32 when the insert is loosely retained within the fitting as seen in FIG. 1. Such guide means, in the preferred exemplary embodiment includes the provision of a forward free end portion 33 on insert 30 which extends outwardly of nut sub-assembly throughbore 32 approximately one-eighth of an inch or more.

In accordance with the method of the present invention, and as can be seen from the foregoing description of a preferred exemplary embodiment of construction of compression type fitting employing the construction of the present invention, a non-metal flexible tubing 40 may be initially engaged upon the aforedescribed guide means on the insert to align the tubing, insert and nut sub-assembly throughbore preparatory to pressing the tubing into the fitting. As seen in FIG. 2, the free end 41 of tubing 40, having an inner bore 42, is shown pressed over the outer end 33 of insert 30. The engagement between insert free end 33 and tubing bore 42 may be as little as approximately one-eighth of an inch. Following this initial engagement, flexible tubing 40 may be raised into the position of FIG. 3 to align the tubing bore 42 with insert 33 and the tubing, insert and nut sub-assembly throughbore 32 to one another, as seen in FIG. 3, preparatory to pressing the tubing into the fitting into the fully assembled relationship illustrated in FIG. 4.

On pressing tubing 40 into fitting body 10, as seen in FIG. 4, the tubing free end 41 is moved inwardly of the fitting tubing receiving bore 16 until it engages flange 31 of insert 30, with flange 31 abutting fitting stop shoulder 17. Insert 30 is thereby placed within the tubing bore 42 in reinforcing relationship preparatory to tightening nut 21 on the threads 15 of forward coupling portion 12. Tightening of nut 21, thereafter in known manner, produces the compression type gripping of tubing 40 for retaining it within the fitting as illustrated in FIG. 5. Thereafter, while sleeve 23, tubing 40 and insert 30 may be substantially permanently assembled to one another, the tubing may still be released from fitting body 10 by merely turning nut 21 back off of threads 15 and withdrawing the nut sub-assembly 21, tubing and insert 30 as an assembly thereof from the fitting body 10.

Having thus described a preferred exemplary embodiment of improvement in compression type end fittings for non-metal flexible tubing in accordance with the construction and method of the present invention, it should be appreciated by those skilled in the art that the present preferred exemplary embodiment achieves the objects and exhibits the advantages stated therefor. In addition, it should be understood by those skilled in the art that various modifications, alterations and adaptations of the improvement in compression type end fittings of the present invention may be made by workers in the art within the scope of the present invention which is defined by the following claims.

I claim:

1. A compression type end fitting for non-metal flexible tubing including:
   a body having threads and a tubing receiving bore terminating at an internal stop shoulder with a continuing smaller diameter through bore,
   a nut sub-assembly of a nut and compression sleeve, the compression sleeve having a tubing receiving through bore and an end portion projecting outwardly of the nut, said nut threaded to said body in untightened relation, and
   a tubing reinforcing insert positioned within said body and nut sub-assembly when the latter are preassembled in a relatively untightened relation preparatory to receiving said tubing
   retaining means on said insert for loosely retaining said insert within said fitting, said retaining means including a flange located between and being larger than said body and sleeve throughbores, said fitting being free of structure preventing abutting of said flange with said stop shoulder; and
   guide means on said insert extending outwardly of said compression sleeve end portion through the throughbore thereof when said insert is loosely retained within said fitting by said retaining means and said insert flange abuts said stop shoulder for guiding a tubing free end over said insert when said nut sub-assembly and body are in said untightened condition,
   said flange having an outer diameter smaller than the inner diameter of said body tubing receiving bore so as to be transversely movable therein,
   whereby on assembly of tubing to said fitting the tubing can be engaged with said outwardly extending guide means to align said insert relative to said tubing before said tubing is pressed into said fitting and before said nut sub-assembly is tightened onto said body,
   said compression sleeve having an outwardly extending shoulder spaced from one end thereof and engaging a shoulder on said nut, said sleeve having a surface at the other end thereof engaging an end surface of the body and adapted to be deformed inwardly to engage the tubing and to produce a compression type gripping of the tubing for retaining it within the fitting.

2. The compression type and fitting of claim 1, wherein the only elements having bores through which tubing passes when tubing is assembled thereto are said body and said compression sleeve, whereby to avoid obstruction to the insertion of tubing into said fitting.

* * * * *